United States Patent [19]

Melancon et al.

[11] 4,337,332

[45] Jun. 29, 1982

[54] LATENTLY CURABLE ORGANOSILICONE COMPOSITIONS

[75] Inventors: Kurt C. Melancon; Frederick J. Palensky, both of St. Paul, Minn.

[73] Assignee: Minnesota Mining and Manufacturing Company, St. Paul, Minn.

[21] Appl. No.: 252,294

[22] Filed: Apr. 9, 1981

[51] Int. Cl.³ ............................................. C08G 77/06
[52] U.S. Cl. ...................................... 528/15; 206/219; 264/331.11; 427/385.5; 427/387; 428/447; 528/31; 528/32; 528/14; 528/26; 528/481
[58] Field of Search ............................ 528/15, 31, 32; 206/219; 427/385.5, 387; 428/447; 264/331.11

[56] References Cited

U.S. PATENT DOCUMENTS

| | | | |
|---|---|---|---|
| 3,188,299 | 6/1965 | Chalk et al. | 260/46.5 |
| 3,188,300 | 6/1965 | Chalk et al. | 260/46.5 |
| 3,192,181 | 6/1965 | Moore | 260/46.5 |
| 3,344,111 | 9/1967 | Chalk | 260/46.5 |
| 3,383,356 | 5/1968 | Nielsen | 260/46.5 |
| 3,445,420 | 5/1969 | Kookootsedes et al. | 260/37 |
| 3,453,234 | 7/1969 | Kookootsedes | 260/46.5 |
| 3,532,649 | 10/1970 | Smith et al. | 260/18 |
| 3,723,567 | 3/1973 | Mink et al. | 260/825 |
| 3,882,083 | 5/1975 | Berger et al. | 260/46.5 |
| 3,933,880 | 1/1976 | Bergstrom et al. | 260/448.2 E |
| 3,989,666 | 11/1976 | Niemi | 260/46.5 |
| 3,989,667 | 11/1976 | Lee et al. | 260/46.5 |
| 4,216,252 | 8/1980 | Moeller | 528/15 |

*Primary Examiner*—Melvyn I. Marquis
*Attorney, Agent, or Firm*—Cruzan Alexander; Donald M. Sell; Lorraine R. Sherman

[57] ABSTRACT

A latently curable organosilicone composition is stabilized against premature gelation by the presence of an amount of an unsaturated amide that is sufficient to inhibit gelation of the composition at low, ambient or room temperature but insufficient to prevent hydrosilation at an elevated temperature.

23 Claims, No Drawings

LATENTLY CURABLE ORGANOSILICONE COMPOSITIONS

TECHNICAL FIELD

This invention relates to latently curable organosilicone compositions capable of undergoing hydrosilation and to the cured products obtained therefrom. In another aspect, it relates to a process for stabilizing organosilicone compositions against premature gelation. In a further aspect, it relates to cured compositions or articles such as adhesive release liners.

BACKGROUND ART

In the presence of catalysts, curable organosilicone compositions undergo hydrosilation, a reaction involving the addition of a silicon-hydrogen bond across a pair of aliphatic carbon atoms linked by multiple bonds and finding widespread use in the production of silicone materials and organosilanes. Reactions of this type are catalyzed by metals, most notably platinum (Pt), rhodium (Rh), iridium (Ir), and palladium (Pd), and compounds thereof. In many instances it is desirable to initially retard or inhibit the hydrosilation reaction in the presence of all of the reactants and later initiate or "trigger" the reaction when desired. This requires the presence in the organosilicone compositions of an inhibitor material that inhibits hydrosilation at relatively low or ambient temperatures and allows the reaction to proceed normally at elevated temperatures, such compositions thus being latently curable compositions stabilized against premature gelation and generally known in the art.

Hydrosilation inhibitors fall into two general classes. One class is composed of materials that effectively inhibit hydrosilation over a wide range of temperatures and can be volatilized out of the organosilicone composition to allow hydrosilation to proceed. Examples of this class are pyridine (U.S. Pat. No. 3,188,299), acrylonitrile (U.S. Pat. No. 3,344,111), 2-ethynylisopropanol (U.S. Pat. No. 3,445,420), and perchloroethylene (U.S. Pat. No. 3,383,356). The other class of inhibitors are materials that are non-volatile; the inhibitory effect of these materials is overcome by heating, whereupon hydrosilation takes place. Examples of this latter class are organic phosphines and phosphites (U.S. Pat. No. 3,188,300), benzotriazole (U.S. Pat. No. 3,192,181), organic sulfoxides (U.S. Pat. No. 3,453,234), metallic salts (U.S. Pat. No. 3,532,649), aminofunctional siloxanes (U.S. Pat. No. 3,723,567), ethylenically unsaturated isocyanurates (U.S. Pat. No. 3,882,083), and olefinic siloxanes (U.S. Pat. Nos. 3,933,880, 3,989,666, and 3,989,667).

Prior art inhibitors often have a number of deficiencies. The volatile inhibitors have the disadvantage of requiring their removal from the composition before hydrosilation can commence. This leads to surface curing that retards complete reaction and leads to poor surface properties in the cured material such as wrinkling. The non-volatile inhibitors may have the disadvantage of requiring undesirably high temperatures and long curing times, e.g., greater than 150° C. for extended periods, i.e., more than 5 minutes, to effect curing, or of requiring high concentrations of inhibitors, which thus dilute the desired silicone content of the product, in order to function effectively. Prior art inhibitors commonly are required to be present in compositions in amounts exceeding one hundred times the weight of metal hydrosilation catalyst present.

DISCLOSURE OF INVENTION

This invention provides a curable organosilicone composition comprising a hydrosilation catalyst and an unsaturated amide containing N-olefinic unsaturation, such as $CH_2=CHCH_2CON(CH_2CH=CH_2)_2$ and $C_6H_5CON(CH_2CH=CH_2)_2$, the amide being incorporated in the composition to inhibit premature gelation or hydrosilation, the amide thereby rendering the composition latently curable. The amides used in this invention effectively inhibit catalyzed hydrosilation reactions at low, ambient or room temperature while allowing efficient hydrosilation reaction rates to occur at elevated temperatures. A wide range of hydrosilation curing rates can be obtained by selecting species with specific structural features from this general class of unsaturated amides. The amides used in the present invention have N-substituted ethylenic or aromatic unsaturation as well as carbonyl substituted unsaturation. By varying the unsaturated groups on both sides of the carbonyl moiety in the amide group, the latently curable organosilicone compositions of the present invention can be provided with different curing rates. This provides for a spectrum of latency in the organosilicone compositions.

These amides are effective, non-volatile inhibitors of catalyzed curable organosilicone compositions. While effectively inhibiting hydrosilation at low or ambient temperature, these amides allow rapid reactions to occur at elevated temperatures. Also, these amides perform their inhibitor function effectively at low concentrations.

DETAILED DESCRIPTION OF THE INVENTION

The present invention provides a latently curable organosilicone composition comprising the following components:

(1) an ethylenically unsaturated polysiloxane having structural units of the formula $$R_a R'_b SiO_{\frac{(4-a-b)}{2}} \qquad \text{I}$$

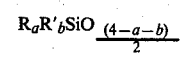

(2) a polyhydrosiloxane having structural units of the formula $$R_a H_b SiO_{\frac{(4-a-b)}{2}} \qquad \text{II}$$

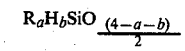

where in formulas I and II each R is bonded to a silicon atom and is independently selected from the group consisting of monovalent aliphatic or aromatic hydrocarbon radicals or halogenated derivatives thereof, cyanoalkyl radicals, and combinations thereof, R having 1 to 13 carbon atoms and preferably 1 to 4 carbon atoms, R' is bonded to a silicon atom and is an ethylenically unsaturated aliphatic hydrocarbon monovalent radical having 2 to 6 carbon atoms, subscript a is a number from 0 to 3 and preferably 0.5 to 2, subscript b is a number from 0.005 to 2.0, and the sum of subscripts a and b is equal to a number from 0.8 to 3, (3) an amount of a platinum- or other metal-containing hydrosilation catalyst sufficient to effectively facilitate the hydrosilation reaction of components (1) and (2), and (4) an amount of an unsaturated amide compound sufficient to inhibit premature gelation of the mixture of components (1) and (2) at low ambient or room temperatures, e.g., 0° C. or lower and up to 40° C., but insufficient in amount to prevent hydrosilation at elevated temperatures, e.g., 50° to 200° C., said unsaturated amide having the structural formula

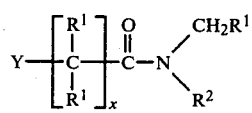

wherein:

$R^1$ is independently selected from $-CH=CH_2$, phenyl, $-H$, an alkyl group having 1 to 4 carbon atoms, or naphthyl;

$R^2$ is $CH_2R^1$, or allyl;

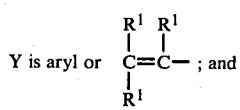

x is 0 or 1;

with the proviso that at least one of $R^1$ and $R^2$ is ethylenically or aromatically unsaturated.

In addition, the present invention provides a process for latent cure reactions in organosilicone compositions, said process comprising the steps of admixing components (1) through (4) together at low, ambient or room temperature, and raising the temperature of the resulting admixture to an elevated temperature when reaction of components (1) and (2) is desired, i.e., when cure of the composition is desired. If the composition is to find application as a molded article, the admixed components may be poured into a heated mold of the desired shape; the article is extracted from the mold after the hydrosilation reaction takes place.

A class of latent curable organosilicone compositions, of formulas I and II above, useful in the present invention are those disclosed in U.S. Pat. No. 3,436,366, which disclosure is incorporated herein by reference.

As to compositions having structural units represented by formula I above, the ethylenically unsaturated polysiloxanes include normally fluid materials which preferably, but not necessarily, are free of silanic hydrogen. Among the radicals which R represents in formula I above are included alkyl, such as methyl, ethyl, propyl, isopropyl, butyl, octyl, and dodecyl, cycloalkyl, such as cyclopentyl, cyclohexyl, and cycloheptyl, aryl, such as phenyl, naphthyl, tolyl, and xylyl, aralkyl, such as benzyl, phenylethyl, and phenylpropyl, halogenated derivatives of the aforesaid radicals such as chloromethyl, trifluoromethyl, chloropropyl, chlorophenyl, dibromophenyl, tetrachlorophenyl, and difluorophenyl, cyanoalkyl, such as betacyano ethyl, gamma-cyanopropyl, and beta-cyanopropyl. R is preferably methyl. Formula I is intended to include those substances wherein R is a combination of the aforesaid radicals to provide a variety of structural units. R' in formula I contains unsaturation by means of a double bond between two vicinal carbon atoms. Among the radicals represented by R' in formula I are alkenyl, such as vinyl, allyl, methallyl, butenyl, and pentenyl. R' is preferably vinyl or allyl, and R' most preferably is vinyl.

The unsaturated polysiloxanes encompassed within the scope of formula I above are well-known in the art, as particularly described in U.S. Pat. Nos. 3,882,083, 3,344,111, and 3,436,366, which descriptions are incorporated herein by reference. Similarly, their preparation and/or commercial availability is also well known.

Specific materials included within the scope of the ethylenically unsaturated polysiloxanes of formula I above contain as few as one silicon atom, such as vinyltrimethylsilane, or more than one silicon atom, such as vinylpentamethyldisiloxane, 1,3-divinyltetramethyldisiloxane, 1,1,3-trivinyltrimethyldisiloxane, 1,1,3,3-tetravinyldimethyldisiloxane, as well as high molecular weight polymers containing up to 10,000 or more silicon atoms per molecule. Preferred compounds of formula I are a vinyldimethyl endblocked polydimethylsiloxane fluid of 50 to 20,000 cps, most preferably 200 to 5,000 cps. Also included within the scope of the ethylenically unsaturated polysiloxanes of formula I are cyclic materials containing silicon-bonded vinyl or allyl radicals, such as the cyclic trimer, tetramer, or pentamer of methylvinylsiloxane, $[(CH_2=CH)(CH_3)(SiO)]_z$, or methylallylsiloxane, $[(CH_2=CH-CH_2)(CH_3)(SiO)]_z$, wherein subscript z is an integer of 3 to 10. Among these cyclic materials, tetramethyltetrallylcyclotetrasiloxane and tetramethyltetravinylcyclotetrasiloxane are preferred.

The polyhydrosiloxane compounds or polymers having structural units represented by formula II above are normally fluid organopolysiloxanes which are preferably, but not necessarily, free of olefinic unsaturation in radical R, but which contain silanic hydrogen. These polyhydrosiloxane compounds represented by formula II above are also well-known in the art and are described in U.S. Pat. Nos. 3,344,111, and 3,436,366, which descriptions are incorporated herein by reference.

Among the radicals represented by R in formula II above are those mentioned above for R in formula I. Also intended to be included within the scope of formula II are those wherein R is a combination of the aforesaid radicals. The R group of formula II preferably is methyl.

Materials specifically encompassed within formula II above include 1,3-dimethyldisiloxane, 1,1,3,3-tetramethyldisiloxane, as well as high polymers containing up to 10,000 or more silicon atoms per molecule. Also included within the scope of formula II above are cyclic materials, such as cyclic polymers of methyl hydrogen siloxane having the formula $(CH_3SiHO)_z$, wherein subscript z is an integer from 3 to 10. Particularly included is tetramethylcyclotetrasiloxane. Within the scope of formula II are hydrogen siloxane units $(HSiO_{1.5})$, methyl hydrogen siloxane units $(HSiCH_3O)$, dimethyl hydrogen siloxane units $[HSi(CH_3)_2O_{0.5}]$, and dihydrogen siloxane units $(H_2SiO)$.

In general, the curable compositions contain from 0.1 to 99.9 weight percent of the siloxane units of formula I with from 0.1 to 99.9 weight percent of the siloxane units of formula II, said weight percent being based on the weight of the total composition.

The hydrosilation catalysts employed in the compositions of the present invention include all of the well-known platinium catalysts which are effective for catalyzing the hydrosilation reaction between silicon-bonded hydrogen groups and silicon-bonded ethylenic groups. These materials include, for example, a finely divided platinum catalyst, such as those described in U.S. Pat. No. 2,970,150, the chloroplatinic acid catalysts described in U.S. Pat. No. 2,823,218, the platinum hydrocarbon complexes taught in U.S. Pat. Nos. 3,159,601, and 3,159,662, as well as the platinum alcoholate catalysts described in U.S. Pat. No. 3,220,972. In addition, the platinum chloride-olefin complexes described in U.S. Pat. No. 3,416,946 are useful herein. All of the teachings of hydrosilation catalysts in the aforesaid U.S. patents are incorporated herein by reference.

Where a platinum catalyst is employed, it is generally present in an amount related to the amount of the ethylenically unsaturated radicals in the polysiloxane component (1) and in an amount sufficient to cause the co-reaction of the ethylenically unsaturated polysiloxane, component (1), and the polyhydrosiloxane, component (2). The platinum catalyst is present in sufficient amount to catalyze the hydrosilation reaction. Satisfactory results may be obtained when the platinum catalyst is present in amounts sufficient to provide as little as one atom of platinum per million silicon-bonded ethylene radicals in the unsaturated polysiloxane. On the other hand, amounts of the platinum catalyst sufficient to provide as high as 1 to 10 platinum atoms per 1,000 silicon-bonded vinyl radicals may also be used. In general, however, it is preferred to employ the platinum catalyst in an amount sufficient to provide one to two hundred platinum atoms per one million silicon-bonded ethylene radicals in the unsaturated polysiloxane component. Also, metals such as rhodium, iridium, and palladium, and their compounds are known to catalyze these hydrosilation reactions and their use is intended to be within the scope of the present invention. Platinum and its compounds is the preferred catalyst.

Preferably amides of formula III above are those in which the N-substituted $R^1$ is vinyl, $R^2$ is allyl, subscript x is 0 or 1, and Y is phenyl, vinyl, or substituted vinyl, for example, $CH_2=CHCON(CH_2CH=CH_2)_2$, $C_6H_5CON(CH_2CH=CH_2)_2$, $CH_2=CHCH_2CON(CH_2CH=CH_2)_2$, and $CH_2=C(CH_3)CON(CH_2CH=CH_2)_2$. Also included within the scope of the present invention are mixtures of the inhibitor compounds of formula III.

The proportions of the reacting components employed in the compositions of the present invention, as mentioned above, can vary within wide limits. These proportions of the components are affected by the stoichiometry of the addition curable reactants, silicone components (1) and (2), since many of the hydrosilation products prepared from the compositions of the invention exhibit satisfactory properties for intended purposes even when the final product contains unreacted silicon-hydrogen linkages. For economic and commercial purposes it is generally preferred that the ethylenically unsaturated polysiloxane and the polyhydrosiloxane be present in such proportions that the latent curable organosilicone composition contains from about 0.005 to 20, preferably 0.1 to 3.0, silicon-hydrogen linkages per silicon-bonded ethylenically unsaturated radical. However, it is often desirable to have an essentially equal number of silicon-hydrogen linkages and ethylene groups in the composition so as to produce a final product which is substantially free of either silicon-hydrogen linkages or silicon-bonded ethylenically unsaturated radicals.

The hydrosilation inhibitors used in the present invention are effective at concentrations of 0.5 to 100 times the weight of metal hydrosilation catalyst in the composition. The metal hydrosilation catalysts are present in sufficient amount to catalyze the hydrosilation reaction. These relatively small quantities of the unsaturated amides used in the present invention are effective in inhibiting low and room temperature (e.g., 0° C. or lower and up to 40° C.) cure reactions while allowing rapid cures at elevated temperatures, e.g., 50° C. to 200° C. Such inhibitory properties ensure a useful pot life of the above-mentioned compositions, yet allow rapid curing when desired.

The latently curable organosilicone compositions of the present invention can be prepared by mixing, in any suitable fashion, all of the components (1) to (4) described hereinabove, plus any additional useful adjuvants often used in organosilicone compositions, e.g., pigments, plasticizers, fillers, etc. As a result of the latent curing ability of the present compositions, these premixed compositions can be stored as such and kept at low ambient or room temperature for extended periods of time until ready to be used. Thus, they provide extended work life without concern for premature gelling.

While the compositions of the present invention can be prepared by premixing all the various components in any desired fashion, it may be found more convenient to prepare these compositions in two separate portions or packages, e.g., in the form of a kit, which are later combined at the time the compositions are to be applied and then cured to a solid rubbery state. Therefore, in the case of a two-package formulation, it is convenient to include in the first package an amount of a metal-containing hydrosilation catalyst sufficient to facilitate the hydrosilation reaction, and in a second package a polyhydrosiloxane, said kit further comprising (a) an amount of an unsaturated amide compound sufficient to inhibit premature gelation of the organosilicone composition at low, ambient or room temperature but insufficient in amount to prevent hydrosilation at an elevated temperature, said unsaturated amide having the structural formula

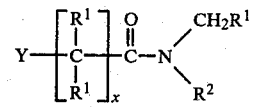

wherein:
$R^1$ is independently selected from $-CH=CH_2$, phenyl, $-H$, an alkyl group having 1 to 4 carbon atoms, or naphthyl;
$R^2$ is $CH_2R^1$, or allyl;

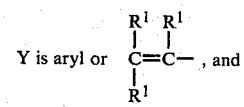

x is 0 or 1;
with the proviso that at least one of $R^1$ and $R^2$ is ethylenically or aromatically unsaturated, and (b) an ethylenically unsaturated polysiloxane, the requisite amounts of each of said substances (a) and (b) being incorporated in whole or in part in either or both of said packages. If other materials or adjuvants generally used with organosilicone compositions similar to those of the present invention are desired, such as fillers, like quartz, silica, titanium dioxide, carbon black, glass fibers, coloring agents, and pigments, they, too, may be placed in either or both of the packages. The second package generally contains as its ingredient the polyhydrosiloxane component. However, as a matter of convenience, the second pcakage may also contain all or part of the unsaturated amide and also all or a portion of the ethylenically unsaturated polysiloxane, and a portion of, for example, the filler material if desired. Conveniently, the packages are of approximately equal weights, but any ratio of weights is acceptable so long as the desired reactant proportions are maintained.

When the two-package system is employed, the two portions are merely mixed in suitable fashion at the point of use and the mixture is cured with the application of heat.

The organosilicone compositions of the present invention are formable materials ranging from thin pastes to stiff plastic, dough-like substances. They can be used for any application requiring a resin or rubber where heat activated curing is possible. The latently curable composition of the present invention may be applied as by molding or extruding, which are followed by heating 1107 (polyhydrosiloxane crosslinker, $(CH_3)_3SiO[CH_3Si(H)O]_{35}Si(CH_3)_3$, Dow Corning Co.). The gel time (i.e., the time it takes for crosslinking to a rubbery state to occur as determined by ASTM Method D-2471-71, reapproved 1979) at ambient temperature was recorded using a "Sunshine" gel time meter (Sunshine Scientific Instruments, Inc., Philadelphia, Pa.) with a ten gram sample of polymer IV in said composition. The gel time at 90° C. as well as the temperature required to effect a gel in less than five seconds was determined using a "Kofler Heizbank" hot bar (Reichert Co., Austria). An inhibitory effectiveness value "V", was calculated by dividing the gel time (in seconds) at ambient temperature, e.g., 23° C., by the less than five second gel temperature (i.e., the temperature in degrees Kelvin at which gelation occurs in less than five seconds). V relates to cure rates at low and high temperatures in the presence of the inhibitor. Results are summarized in TABLE I. As can be seen from the data in this table, the compounds of the invention provide a desirable range of latency. The best inhibitors in terms of long pot life are those with large V values. However, all of these compounds may have uses for specific cure requirements.

TABLE I

| Ex. No. | Inhibitor | Gel time at 90° C. (sec) | Gel time at ambient temp. (sec) | Temp °K., <5 sec cure | Inhibitor effectiveness $(V)^{(a)}$ |
|---|---|---|---|---|---|
| 1 | None (control) | 1 | 678 | 353 | 1.92 |
| 2 | $CH_2=CHCON(CH_3)CH_2C_6H_5$ | 1.5 | 750 | 343 | 2.19 |
| 3 | $C_6H_5CON(CH_3)C_6H_5$ | 2 | 852 | 348 | 2.44 |
| 4 | $CH_2=CHCON(CH_3)C_6H_5$ | 2 | 918 | 348 | 2.63 |
| 5 | $C_6H_5CON(CH_3)CH_2C_6H_5$ | 2 | 972 | 353 | 2.75 |
| 6 | $CH_2=CHCON(CH_2-CH=CH_2)_2$ | 3 | 1980 | 358 | 5.53 |
| 7 | $C_6H_5CH=CHCON(CH_2-CH=CH_2)_2$ | 4 | 2340 | 363 | 6.44 |
| 8 | $(CH_3)_2C=CHCON(CH_2-CH=CH_2)_2$ | 8 | 3354 | 373 | 8.99 |
| 9 | $C_6H_5CH_2CON(CH_2CH=CH_2)_2$ | 5 | 4020 | 363 | 11.07 |
| 10 | $C_6H_5CON(CH_2CH=CH_2)_2$ | 8 | 4380 | 373 | 11.74 |
| 11 | $CH_2=CHCH_2CON(CH_2CH=CH_2)_2$ | 10 | 8298 | 373 | 22.24 |
| 12 | $CH_2=C(CH_3)CON(CH_2CH=CH_2)_2$ | 8 | 8520 | 368 | 23.15 |

$(a)$ $\frac{\text{Gel time in ambient (sec)}}{<5 \text{ sec cure temp } °K.}$ to "delatenize" or effect cure, to form silicone rubber fabricated articles, such as O-rings, gaskets, or tubing. The cured compositions are useful as release coatings, i.e., when coated on a substrate they provide a release surface for an adjacent adhesive layer.

Objects and advantages of this invention are further illustrated by the following examples, but the particular materials and amounts thereof recited in these examples, as well as other conditions and details, should not be construed to unduly limit this invention.

EXAMPLES 1-12

The effectiveness of a number of the hydrosilation inhibitors of the present invention was demonstrated by incorporating them at a level of 0.04 wt% in a siloxane composition consisting of a polymer, which can be represented by the formula

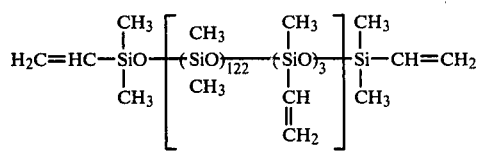

IV 50 ppm of Pt metal based on weight of said polymer, (pyridine)$PtCl_2(C_2H_4)$ as catalyst, and 4.5 wt% DC-

EXAMPLE 13

The latently curable siloxane composition prepared for Example 12 was coated at a thickness of approximately 1 micron on 51-micron thick polyethylene terephthalate film. This coating was cured in a circulating air oven at 150° C. for 60 sec. Release values were generated for this siloxane coating and for a glass surface utilizing Scotchbrand No. 800 Transparent Tape. The tape was adhered to the surfaces with a 2 kg rubber covered roller which was passed over the tape at 230 cm/minute. The tape was pulled from the surface at an angle of 180° and a rate of 230 cm/min. Adhesive release from the siloxane surface was 1 g/2.5 cm width compared to adhesive release from the glass surface of 560 g/2.5 cm width, indicating that the cured silicone composition was an excellent release coating, i.e., it provides releasable adherence to an adhesive layer.

EXAMPLES 14-15

By varying the concentration of the inhibitor, the curing conditions may be effectively varied. This variation is demonstrated in Examples 14-15. Utilizing the inhibitor of Example 9 and the same procedure as disclosed in Examples 1-12, the data are recorded in Table II.

TABLE II

| Ex. No. | Wt. % based on IV | Gel time at 90° C. (sec.) | Gel time at Ambient (sec.) | Temp. °K. < 5 sec. cure | Inhibitor effectiveness V |
| --- | --- | --- | --- | --- | --- |
| 9 | .04 | 5 | 4020 | 363 | 11.07 |
| 14 | .02 | 2 | 1221 | 353 | 3.46 |
| 15 | .06 | 15 | 17976 | 373 | 48.2 |

The data show that at higher concentrations of inhibitor longer ambient gel times and greater inhibitor effectiveness result.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A latently curable organosilicone composition, comprising the following components:
   (a) an ethylenically unsaturated polysiloxane,
   (b) a polyhydrosiloxane,
   (c) an amount of a metal-containing catalyst sufficient to facilitate the reaction of components (a) and (b), and
   (d) an amount of an unsaturated amide compound sufficient to inhibit premature gelation of the mixture of components (a), (b), and (c) at low, ambient or room temperature but insufficient in amount to prevent hydrosilation of the mixture at an elevated temperature, said unsaturated amide having the structural formula

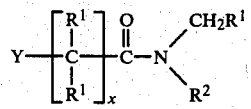   III wherein:
$R^1$ is independently selected from $-CH=CH_2$, phenyl, $-H$, an alkyl group having 1 to 4 carbon atoms, or naphthyl;
$R^2$ is $CH_2R^1$, or allyl;

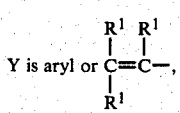

and
x is 0 or 1;
with the proviso that at least one of $R^1$ and $R^2$ is ethylenically or aromatically unsaturated.

2. The cured product of claim 1.

3. A latently curable organosilicone composition, comprising the following components:
   (a) an ethylenically unsaturated polysiloxane having structural units of the formula,

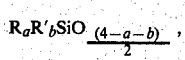   I (b) a polyhydrosiloxane having structural units of the formula,

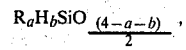   II wherein in formulas I and II each R is bonded to a silicon atom and is independently selected from the group consisting of monovalent aliphatic or aromatic hydrocarbon radicals or halogenated derivatives thereof, cyanoalkyl radicals, and combinations thereof, R having 1 to 13 carbon atoms, R' is bonded to a silicon atom and is an ethylenically unsaturated aliphatic hydrocarbon monovalent radical having 2 to 6 carbon atoms, subscript a is a number from 0 to 3, subscript b is a number from 0.005 to 2.0, and the sum of subscript a and subscript b is equal to a number from 0.8 to 3,
   (c) an amount of a platinum- or other metal-containing hydrosilation catalyst to facilitate the hydrosilation reaction of components (a) and (b), and
   (d) an amount of an unsaturated amide compound sufficient to inhibit premature gelation of the mixture of components (a), (b), and (c) at low, ambient or room temperature but insufficient in amount to prevent hydrosilation at an elevated temperature, said unsaturated amide having the structural formula

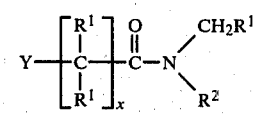   III wherein:
$R^1$ is independently selected from $-CH=CH_2$, phenyl, $-H$, an alkyl group having 1 to 4 carbon atoms, or naphthyl;
$R^2$ is $CH_2R^1$, or allyl;

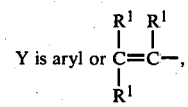

and
x is 0 or 1;
with the proviso that at least one of $R^1$ and $R^2$ is ethylenically or aromatically unsaturated.

4. The latently curable composition according to claim 3 wherein R has 1 to 4 carbon atoms.

5. The latently curable composition according to claim 3 wherein R is methyl.

6. The latently curable composition according to claim 3 wherein R' is vinyl or allyl.

7. The latently curable composition according to claim 3 wherein subscript a is a number from 0.5 to 2.

8. The latently curable composition according to claim 3 wherein said composition contains 0.1 to 99.9 weight percent of siloxane units of formula I, and 0.1 to 99.9 weight percent of siloxane units of formula II.

9. The latently curable composition according to claim 3 wherein said composition contains from about 0.005 to 20 silicon-hydrogen linkages per silicon-bonded ethylenically unsaturated unit.

10. The latently curable composition according to claim 3 wherein said composition contains from about 0.1 to 3.0 silicon-hydrogen linkages per silicon-bonded ethylenically unsaturated unit.

11. The latently curable composition according to claim 3 wherein the unsaturated amide is present in a concentration of 0.5 to 100 times the weight of the metal hydrosilation catalyst in said composition.

12. The latently curable composition according to claim 3 wherein in the unsaturated amide, the N-substituted $R^1$ is vinyl, $R^2$ is allyl, subscript x is zero or one, and Y is phenyl, vinyl, or substituted vinyl.

13. The latently curable composition according to claim 3 wherein hydrosilation is inhibited in the temperature range 0° to 40° C.

14. The latently curable composition according to claim 3 wherein hydrosilation takes place in the temperature range 50° to 200° C.

15. The latently curable composition according to claim 3 wherein the unsaturated amide compound is $CH_2=CHCON(CH_2-CH=CH_2)_2$.

16. The latently curable composition according to claim 3 wherein the unsaturated amide compound is $C_6H_5CON(CH_2CH=CH_2)_2$.

17. The latently curable composition according to claim 3 wherein the unsaturated amide compound is $CH_2=CHCH_2CON(CH_2CH=CH_2)_2$.

18. The latently curable composition according to claim 3 wherein the unsaturated amide compound is $CH_2=C(CH_3)CON(CH_2CH=CH_2)_2$.

19. The cured product of claim 3.

20. A process comprising the steps:
    (a) mixing at ambient temperatures
       (1) an ethylenically unsaturated polysiloxane,
       (2) a polyhydrosiloxane,
       (3) an effective amount of a metal-containing hydrosilation catalyst to facilitate the addition cure reaction of components (1) and (2), and
       (4) an amount of an unsaturated amide compound sufficient to inhibit premature gelation of the mixture of components (1), (2), and (3) at low ambient or room temperature but insufficient in amount to prevent hydrosilation at an elevated temperature, said unsaturated amide having the structural formula

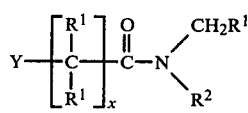    III wherein:
$R^1$ is independently selected from $-CH=CH_2$, phenyl, $-H$, an alkyl group having 1 to 4 carbon atoms, or naphthyl;
$R^2$ is $CH_2R^1$, or allyl;

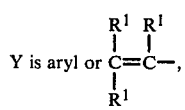

and
x is 0 or 1;
with the proviso that at least one of $R^1$ and $R^2$ is ethylenically or aromatically unsaturated,
(b) applying the resulting admixture, and
(c) elevating the temperature of the resulting applied admixture when cure of said admixture is to be effected.

21. A process comprising the steps:
    a. admixing at ambient temperatures
       (1) an ethylenically unsaturated polysiloxane having structural units of the formula,

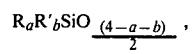    I (2) a polyhydrosiloxane compound having structural units of the formula,

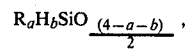    II wherein in formulas I and II each R is independently selected from the group consisting of monovalent aliphatic or aromatic hydrocarbon radicals, or halogenated derivatives thereofs, cyancalkyl radical, and combinations thereof, R having 1 to 13 carbon atoms, R' is an ethylenically unsaturated aliphatic hydrocarbon monovalent radical having 2 to 6 carbon atoms, subscript a is a number from 0 to 3, subscript b is a number from 0.005 to 2.0, and the sum of subscripts a and b is equal to a number from 0.8 to 3,
       (3) an amount of a platinum- or other metal-containing hydrosilation catalyst to facilitate the hydrosilation reaction of components (1) and (2), and
       (4) an amount of an unsaturated amide sufficient to inhibit premature gelation of components (1) and (2) at low, ambient or room temperature but insufficient in amount to prevent hydrosilation at elevated temperature, said unsaturated amide having the structural formula,

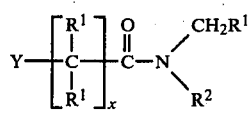    III wherein:
$R^1$ is independently selected from $-CH=CH_2$, phenyl, $-H$, an alkyl group having 1 to 4 carbon atoms, or naphthyl;
$R^2$ is $CH_2R^1$, or allyl;

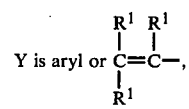

and
x is 0 or 1;
with the proviso that at least one of $R^1$ and $R^2$ is ethylenically or aromatically unsaturated,
    b. applying the resulting admixture by coating it on a substrate, or molding, or extruding it, and
    c. raising the temperature of the resulting applied admixture to the range of 50° to 200° C.

22. An adhesive release liner comprising a substrate coated on at least one surface thereof with the cured composition of claims 2 or 19.

23. A kit for preparing a latently curable organosilicone composition capable of undergoing hydrosilation and having component parts capable of being mixed when the composition is to be applied, said kit comprising the combination of a first package containing an amount of a metal-containing hydrosilation catalyst sufficient to facilitate the hydrosilation reaction, and a second package containing a polyhydrosiloxane, said kit further comprising (a) an amount of an unsaturated amide compound sufficient to inhibit premature gelation of the organosilicone composition at low ambient or room temperature but insufficient in amount to prevent hydrosilation at an elevated temperature, said unsaturated amide having the structural formula

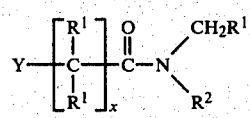   III wherein:

$R^1$ is independently selected from $-CH=CH_2$, phenyl, $-H$, an alkyl group having 1 to 4 carbon atoms, or naphthyl;

$R^2$ is $CH_2R^1$, or allyl;

Y is aryl or 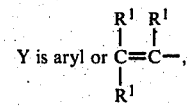

and x is 0 or 1;

with the proviso that at least one of $R^1$ and $R^2$ is ethylenically or aromatically unsaturated, and (b) an ethylenically unsaturated polysiloxane, the requisite amounts of each of said substances (a) and (b) being incorporated in whole or in part in either or both of said packages.

* * * * *